United States Patent [19]

Robak et al.

[11] Patent Number: 4,601,750
[45] Date of Patent: Jul. 22, 1986

[54] SCRAP MELTING SYSTEM

[75] Inventors: Casimir B. Robak, Newburgh; Everett M. Ramsey, Richland; Gary A. Beil; Bruce A. Gray, both of Newburgh, all of Ind.

[73] Assignee: Aluminum Company of America, Pittsburgh, Pa.

[21] Appl. No.: 750,337

[22] Filed: Jun. 28, 1985

[51] Int. Cl.$^4$ ............................ C22B 21/00; C22B 9/16
[52] U.S. Cl. ...................................... 75/65 R; 75/68 R
[58] Field of Search ................ 266/900, 901, 144; 75/68 R, 65

[56] References Cited

U.S. PATENT DOCUMENTS

| | | | |
|---|---|---|---|
| 3,839,016 | 10/1974 | Rawlings | 75/43 |
| 3,933,343 | 1/1976 | Rawlings | 266/16 |
| 3,997,336 | 12/1976 | van Linden et al. | 75/68 R |
| 4,010,935 | 3/1977 | Stephens | 266/901 |
| 4,128,415 | 12/1978 | van Linden et al. | 75/65 R |
| 4,147,531 | 4/1979 | Miller | 75/68 R |
| 4,286,985 | 9/1981 | van Linden et al. | 75/65 R |
| 4,319,921 | 3/1982 | Pryor et al. | 75/65 R |

OTHER PUBLICATIONS

North American Mfg. Co., Bulletin 44.42, Oct. 1971, "Tempest Burners".

Primary Examiner—Melvyn J. Andrews
Attorney, Agent, or Firm—Brian D. Smith

[57] ABSTRACT

A process for removing hydrocarbon combustibles from the surface of metal particles and recovering the heat content therefrom is disclosed. The process is carried out in a system having a smoke collection zone, a heating zone and burner means supplied with fuel and air. The process includes charging the metal particles into a moving molten metal bath contained in the smoke collection zone. The charging generates smoke and vaporizes the hydrocarbon combustibles to provide unburned hydrocarbon fumes. A burner means is fired to draw transporting gas into the smoke collection zone to entrain and transport the smoke and fumes from the smoke collection zone to a jet stream exiting the burner means. The smoke and fumes are incinerated in the jet stream to provide hot gas. The transporting gas also contains oxygen for incinerating the smoke and fumes. The hot gas provided by incinerating the smoke and fumes is then jetted via the jet stream into the heating zone where its heat content is recovered.

10 Claims, 1 Drawing Figure

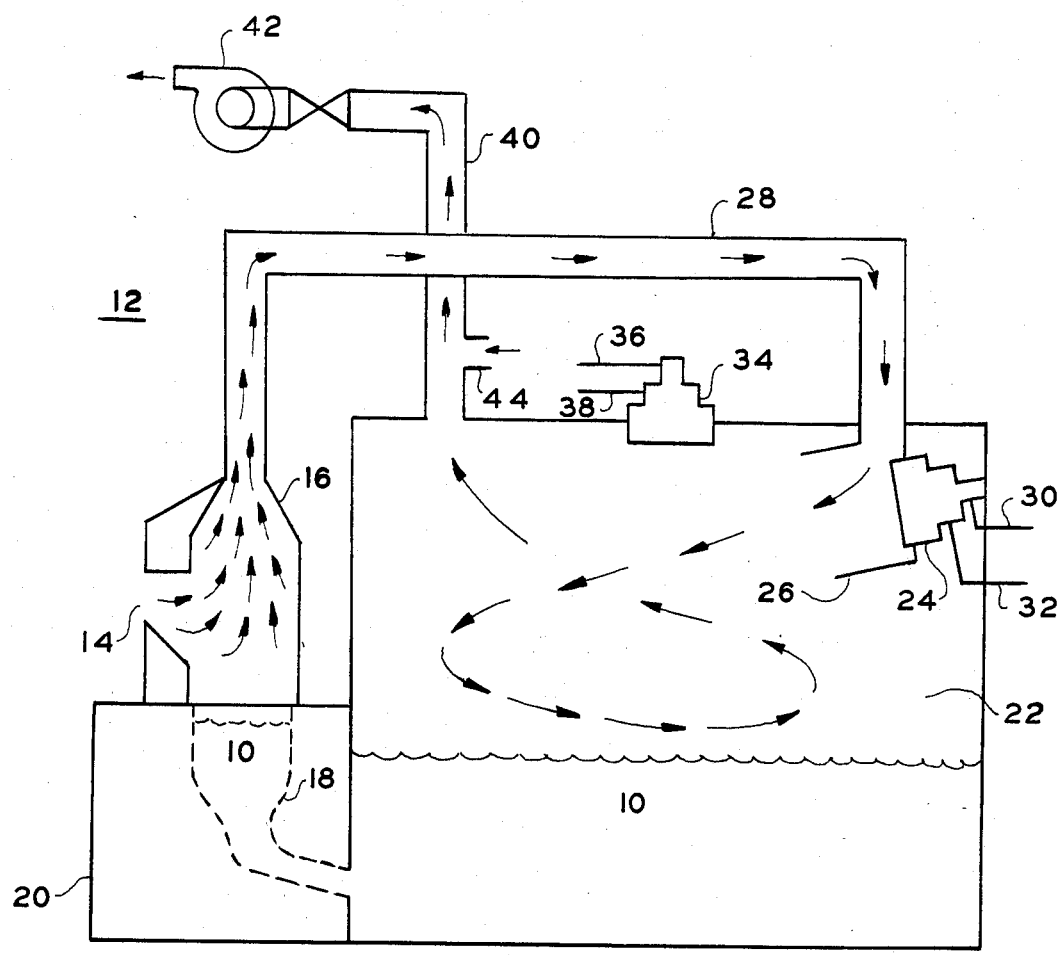
FIGURE

SCRAP MELTING SYSTEM

BACKGROUND OF THE INVENTION

The present invention relates generally to the reclaiming of scrap metal and, more particularly, to an improved process and system for removing contaminating combustibles from the surface of scrap metal wherein the heat content of the contaminating combustibles is recovered.

In the reclamation of scrap metal, particularly scrap aluminum, it is generally desirable to remove contaminants, such as oil, paint, lacquer and grease, etc., from the surface of the metal to be reclaimed. Since it is known that the contaminants have heat content, various processes and equipment have been designed which remove these contaminants and recover their heat content.

U.S. Pat. Nos. 3,839,016 and 3,933,343 to Rawlings disclose a well-type melting furnace for reclaiming metals from metallic scrap material contaminated with combustibles. It includes a large well which is operatively divided into two communicating wells: one being the receiving well for scrap material during melting and the other being the main holding well for molten metal. A combustion chamber, defined over the main holding well, is equipped with a burner secured within the input opening of the combustion chamber to provide the heat for melting and treating the scrap material. Heat from molten material flowing between the holding well and the scrap receiving well produces combustible fumes by vaporizing the combustibles of the scrap material. The heat also preheats the air above the scrap receiving well. A vaporization chamber defined over the scrap receiving well has an exhaust opening and duct means connecting the same with the burner. A blower means secured in the duct means collects the fumes and preheated air from the vaporization chamber for ignition at the burner in the combustion chamber. In this manner, the vaporized combustibles generated by scrap material in the receiving well are prevented from escaping and are utilized in the melting process. Fluxes are also added to the vaporization chamber to prevent oxidation of the scrap.

U.S. Pat. No. 4,319,921 to Pryor et al also discloses a well-type melting furnace divided into two communicating wells: a scrap receiving well and a main holding well. A vaporization chamber is provided over the scrap receiving well for collecting combustible fumes rising from the scrap. To control fume generation and to minimize oxidation of the scrap metal in the receiving well, the receiving well and vaporization chamber are entirely enclosed. The only entry to its interior is through the receiving well doors which are kept closed except during charging and stirring. This thereby enables control over the amount of air admitted to the receiving well which enables control over fume generation and minimizes metal oxidation. As with Rawlings, the process in Pryor recovers the heat content of the fumes by collecting the fumes from the vaporization chamber and incinerating them in the combustion chamber. The fumes are channeled to the combustion chamber from the vaporization chamber by an educator means secured within a circulating passage which connects the respective chambers. A preferred educator means is provided by a burner means which provides preliminary incineration of the fumes prior to their complete incineration in the main well or combustion chamber by the main burner means. While the process disclosed in Pryor may work well for processes wherein the metal is charged in a batch-like manner, the process' requirement of an enclosed side well or vaporization chamber renders it completely unsuitable for continuous charging processes. Moreover, while both of the above processes may work as intended, there is always a need for processes which operate simply and more efficiently.

SUMMARY OF THE INVENTION

The present invention provides a process and system for removing contaminating hydrocarbon combustibles from the surface of metal particles to be reclaimed which, in addition, recovers and utilizes the heat content of the combustibles. The process is carried out in a furnace-like melting system having at least a smoke collection zone, a heating zone and burner means supplied with fuel and air. The smoke collection zone contains a bath of moving molten metal. The metal particles contaminated with the hydrocarbon combustibles are charged into the moving molten metal bath, which preferably moves in a manner that enhances ingestion of the metal particles into the bath to minimize oxidation of the particles. The hydrocarbon combustibles vaporize upon contact with the molten metal bath to provide smoke and at least partially unburned hydrocarbon fumes. The burner means, preferably a high velocity burner means, is fired to preferably provide a high velocity jet stream and draw gas, preferably air, containing combustion supporting oxygen into the smoke collection zone for purposes of entraining the smoke and fumes in the gas transporting them to the jet stream. The smoke and fumes incinerate in the jet stream to provide hot gas which is then jetted via the jet stream into the heating zone where the heat content of the smoke and fumes is recovered. The process is simple and efficient since fume collection, fume incineration and hot gas jetting are all provided by firing the burner means. Accordingly, the need for expensive and maintenance-intensive eductor means, such as recirculating fans, is obviated.

BRIEF DESCRIPTION OF THE DRAWING

The sole FIGURE is a schematic drawing of the system of the present invention illustrating the charging of metal particles into a moving bath of molten metal, the subsequent heating of the moving molten metal bath, and the movement of gas through the system.

DETAILED DESCRIPTION

Referring now to the sole FIGURE, metal scrap particles (not shown), such as oily aluminum briquettes containing 3% oil, are charged into a bath of moving molten metal 10, such as molten aluminum contained in a heated charging bay system 12 which returns the molten metal to a heating bay (not shown) as part of a continuous melting process. Continuous melting processes are disclosed in U.S. Pat. Nos. 3,997,336 and 4,128,415 to van Linden et al, which are hereby incorporated by reference. Returning to the FIGURE, the metal particles enter the charging bay system through an inlet 14 of a smoke collection chamber 16 which contains the moving or flowing molten metal in its bowl 18 which is defined by the smoke chamber's base 20. After charging into bowl 18, the metal is quickly ingested into the molten bath which continuously flow to a heating zone 22 of charging bay system 12 where the molten metal is heated in accordance with the present invention. The heated molten metal is then returned to the heating bay (not shown).

The molten metal in bowl 18 is preferably moving or flowing in a manner that quickly absorbs or ingests the oily metal particles. A preferred system for ingesting metal particles into a molten metal bath is described in U.S. Pat. No. 4,286,985 to van Linden et al, which hereby is incorporated by reference. In van Linden, enhanced scrap metal ingestion is provided by moving the molten metal bath in a manner which creates a disturbed vortex-like flow path, the vortex being disturbed in the sense that its symmetry is disrupted in a manner which enhances ingestion of the scrap metal into the molten metal.

Whatever the means of scrap ingestion, oil on the scrap particles generates tremendous volumes of smoke and fumes when the particles contact the molten bath. Heretofore, it has not been easy or inexpensive to handle the smoke and fumes. The fumes were sent directly to an exhaust stack where they were burned by a fuel-hungry incinerator. The fuel costs associated with this incineration were significant (i.e., between 16 and 30 million Btu's /hr when processing aluminum scrap containing 3% oil at 20,000 lb/hr), and with fuel costs increasing almost daily, fuel consumption became a major concern.

In accordance with the present invention, a high velocity fume burner 24 is provided in the wall of an elbow 26 of a smoke collection duct 28 which is in flow communication with smoke collection chamber 16. The high velocity fume burner which is supplied with fuel and air (preferably on ratio) by lines 30 and 32, respectively, the fuel preferably being natural gas, is arranged in the wall of elbow 26 such that the high velocity jet stream (not shown) discharging from the burner is located and directed downstream from the burner, downstream being in the direction of the heating zone and between the heating zone 22 and burner 24. This arrangement or positioning of the burner creates a negative pressure zone outside the burner but within the elbow, smoke collection duct 28 and smoke collection chamber 16. This causes or, in effect, draws outside or ambient air (air and gas flow indicated by arrows) through inlet 14 into smoke collection chamber 16 and into the jet stream. The smoke and fumes generated in the smoke collection zone or chamber are then entrained in the air (referred to herein as transporting air) entering the smoke collection chamber and transported through smoke collection duct 28 to elbow 26 where they quickly mix and ignite in the high velocity jet stream exiting fume burner 24. Mixing and ignition of the smoke and fumes in the jet stream are particularly enhanced by the present invention because the negative pressure created by the jet stream's high velocity literally sucks the smoke and fumes into the jet stream. The jet stream now carrying the burning smoke and fumes generally penetrates a few feet into the heating zone. This distance can be adjusted to maximize heat transfer to the melt by adjusting the fume burner in accordance with the burner's instructions. While the smoke and fumes ignite and burn in the jet stream, they generally do not completely combust until they have left or exited the jet stream and entered the heating zone. The gas which exits the jet stream (i.e., that now comprised of the burning smoke and fumes, transporting air, and fuel and air supplied to the fume burner) is extremely hot (i.e., between about 1600° and 1800° F.) and is referred to herein as the hot gas.

The aforementioned transporting air also provides oxygen for the fume's incineration. The amount of transporting air drawn into the smoke collection zone is preferably controlled to (1) provide sufficient oxygen for complete fume incineration, and (2) entrain and transport all smoke and fumes to the burner means. Preferably, however, no more than the minimum amount of transporting air which is necessary to do the above should be drawn into the smoke collection zone. More air will only cause unnecessary and unwanted cooling of the smoke, fumes and transporting air. Transporting air influx into the smoke collection zone can be controlled, for example, by providing an air curtain on the smoke collection zone's input and adjusting it to draw in the proper amount of air.

To maximize transfer of the heat to the molten metal or melt 10 in heating zone 22, it is important to position or aim the fume burner so the hot gas leaving the jet stream transfers as much heat as possible to the melt without oxidizing or burning the melt. In the embodiment illustrated, heat transfer is enhanced by tilting the fume burner and the elbow 26 outlet downwardly approximately 10° or 15° with respect to horizontal and angling them so the hot gas leaving the jet stream blows down and around heating zone 22 in a whirling or vortical manner, as shown by the arrows. The hot gases preferably are not aimed directly at the melt since this might oxidize the melt and generate undesirable skim. A fume burner which has been found to provide good smoke collection, incineration and hot gas jetting is the Tempest burner, Model No. 4442-7, which is manufactured by the North American Manufacturing Company of Cleveland, Ohio.

Also illustrated in the sole FIGURE is an auxiliary burner 34 which is supplied with fuel (preferably natural gas) and air through lines 36 and 38, respectively. This burner may or may not be needed depending on the heat requirements in the heating zone. Generally, it is only used to heat the melt in zone 22 when scrap is not being fed into the system. A suitable auxiliary burner can also be purchased from the North American Manufacturing Company of Cleveland, Ohio.

Also illustrated in the FIGURE is an exhaust stack 40 for exhausting clean, combusted gas from the heating zone. Since fume burner 24 is positioned to cause the hot gas exiting therefrom to whirl down and around the heating zone, the gas which eventually rises to enter the exhaust stack should be fully combusted. While fully combusted and thus relatively clean from a pollution standpoint, this gas is, as previously mentioned, extremely hot (i.e., between 1600° and 1800° F.). To protect an exhaust fan 42 located downstream on the exhaust stack and to prevent roof fires on wooden roofs, the exhaust gas is preferably cooled with ambient air to about 800° F. This ambient air enters the exhaust stream through a dilution air inlet 44 provided in the exhaust stack wall. While the exhaust fan and dilution air inlet are illustrated in the sole FIGURE, it is believed that they may not be needed if the exhaust stack is properly designed to permit exhausting to occur by natural ventilation. This would be desirable in that energy costs associated with exhaust fan operation would be saved.

A system substantially similar to that illustrated in the FIGURE was operated to process 20,000 lb/hr of oily aluminum briquettes containing 3% oil. This translates into an oil processing rate of approximately 600 lb/hr.

Since oil contains approximately 12,000 Btu's/lb, the potential heat recovery therefrom was 7.5 million lb/hr. While it is not known how much of this heat was actually recovered, operation was sustained without having to use auxiliary burner 34, except when scrap charging was halted. Fuel consumption at the 20,000 lb/hr operating rate was only about 2 million Btu's /hr.

Accordingly, those skilled in the art will appreciate that the present invention provides an extremely efficient process for removing contaminants from the surface of metal scrap to be reclaimed which recovers and uses much of the available heat content in the contaminants. Further savings are provided by using a high velocity fume burner which obviates the need for expensive, maintenance-intensive recirculating fans in the smoke collection duct 28.

While the invention has been described in terms of preferred embodiments, the claims appended hereto are intended to encompass all embodiments which fall within the spirit of the invention.

What is claimed is:

1. A process for removing hydrocarbon combustibles from the surface of metal and recovering the heat content therefrom, said process being carried out in a system having at least a smoke collection zone, a heating zone and burner means supplied with fuel and air, said process comprising the steps of:
   (a) providing a bath of moving molten metal in the smoke collection zone;
   (b) charging the metal into the moving molten metal bath, said charging generating smoke and vaporizing the hydrocarbon combustibles to provide unburned hydrocarbon fumes; and
   (c) firing the burner means to
      (1) draw gas into the smoke collection zone to entrain and transport said smoke and fumes from the smoke collection zone to the burner means, said gas also providing oxygen for incineration of said smoke and fumes;
      (2) incinerate said smoke and fumes to provide hot gas; and
      (3) jet said hot gas into said heating zone.

2. The process of claim 1 wherein the gas is outside air.

3. The process of claim 1 further comprising exhausting clean gas from the heating zone to prevent pressure from rising in the heating zone, said clean gas being relatively smoke-free and low in fume content with respect to that containing said smoke and fumes to be incinerated.

4. The process of claim 1 wherein the heating zone contains molten metal which is heated by the hot gas jet directed into the heating zone.

5. The process of claim 1 wherein the moving bath of molten metal flows from the smoke collection zone to the heating zone.

6. The process of claim 1 wherein the molten metal moves in a manner creating a disturbed vortex-like flow path, said vortex flow path being disturbed in that its symmetry is disrupted to enhance ingestion of the metal into the molten metal.

7. The process of claim 3 further comprising the step of cooling said exhaust gas by diluting it with outside air.

8. The process of claim 1 wherein the amount of air drawn into the smoke collection zone is sufficient to provide adequate oxygen for incinerating said smoke and fumes and sufficient for entrainment and transportation of said smoke and fumes to the burner means but not excessive such that the smoke and fumes experience unnecessary cooling.

9. The process of claim 3 wherein the hot gas is jetted into the heating zone in a manner that enhances heat transfer from the hot gas to the molten metal.

10. A process for removing hydrocarbon combustibles from the surface of metal and recovering the heat content therefrom, said process being carried out in a system having at least a smoke collection zone, a heating zone and burner means supplied with fuel and air, said process comprising the steps of:
    (a) providing a bath of molten metal flowing through the smoke collection and heating zones of the system;
    (b) charging the metal into the molten metal bath flowing through the smoke collection zone, said charging generating smoke and vaporizing the hydrocarbon combustibles to provide unburned hydrocarbon fumes;
    (c) firing the burner means to
       (1) provide a high velocity jet stream downstream from the burner means;
       (2) draw gas into the smoke collection zone to entrain and transport said smoke and fumes from the smoke collection zone to the jet stream, said gas also providing oxygen for ignition and incineration of said smoke and fumes;
       (3) ignite said smoke and fumes in the jet stream to provide hot gas; and
       (4) jet said hot gas in the jet stream into said heating zone to heat the molten metal flowing therethrough; and
    (d) exhausting clean gas from the heating zone to prevent pressure from rising in the heating zone, said clean gas being relatively smoke-free and low in fume content with respect to that containing said smoke and fumes to be ignited and incinerated.

* * * * *